J. A. LIVINGS.
SPRING WHEEL.
APPLICATION FILED JULY 31, 1920.
1,397,839.
Patented Nov. 22, 1921.
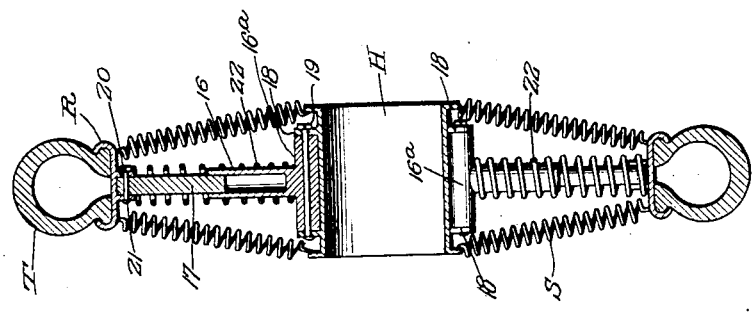
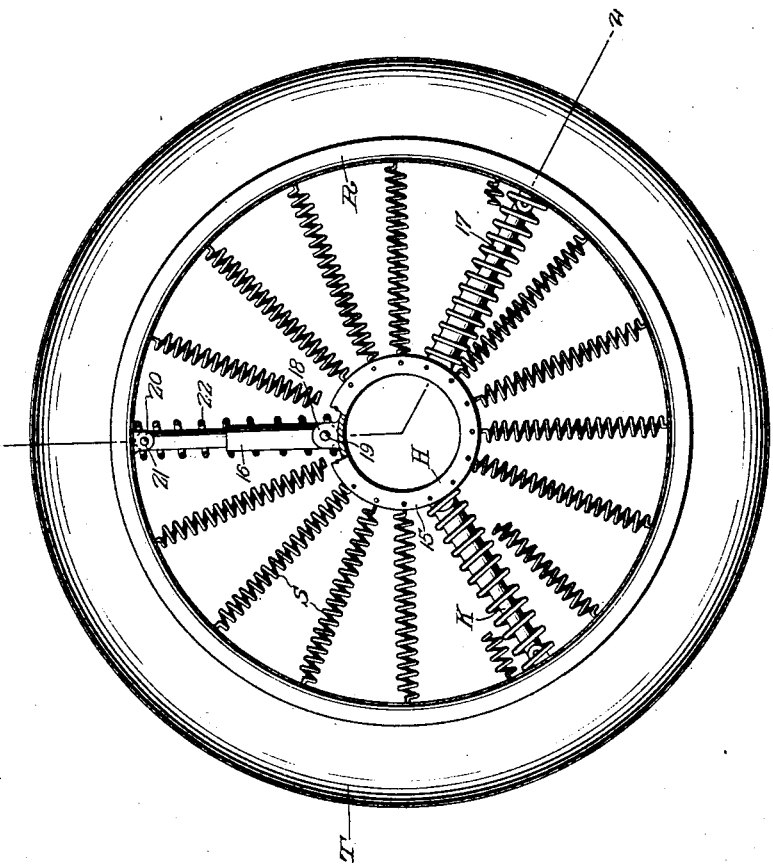
WITNESSES
INVENTOR
J. A. Livings,
BY
ATTORNEYS

UNITED STATES PATENT OFFICE.

JAMES ARTHUR LIVINGS, OF SPRING, TEXAS.

SPRING-WHEEL.

1,397,839.

Specification of Letters Patent. Patented Nov. 22, 1921.

Application filed July 31, 1920. Serial No. 400,415.

*To all whom it may concern:*

Be it known that I, JAMES ARTHUR LIVINGS, a citizen of the United States, and a resident of Spring, in the county of Harris and State of Texas, have invented certain new and useful Improvements in Spring-Wheels, of which the following is a specification.

My invention relates to spring wheels, and a purpose of the invention is the provision of a wheel having resilient extensible spokes which support the hub in such manner that when the wheel is applied to the axle of a car, the car is resiliently suspended from the top of the wheel rim whereby, a resilient support is provided for the vehicle which absorbs and thus prevents transmission of vibrations from the wheel to the axle.

It is also a purpose of my invention to provide a wheel of the above described character having stabilizing means for preventing lateral movement of the rim or hub when the wheel is making sharp turns.

I will describe one form of spring wheel embodying my invention, and will then point out the novel features thereof in the claim.

In the accompanying drawings:—

Figure 1 is a view showing in side elevation, with parts broken away, one form of wheel embodying my invention; and Fig. 2 is a transverse sectional view taken on the line 2—2 of Fig. 1.

Referring specifically to the drawings, in which similar reference characters refer to similar parts, R designates a conventional form of rim of the clencher type which carries a tire T, and within the rim is suspended a hub H of such a length that its opposite ends project beyond the plane defined by the edges of the rim in a manner similar to the hub of the Houck wheel. The hub H is resiliently suspended within the rim R by means of a plurality of coiled contractile springs S which are connected at their outer ends to the rim and at the inner ends to flanges 15 formed on the opposite ends of the hub H. As shown, the springs S are arranged in pairs with the springs of each pair disposed at spaced intervals in a manner similar to spokes, such springs in fact constituting resilient spokes that form a resilient supporting means for the hub H.

When the wheel is applied to the axle of a vehicle, it will be seen that the weight of the bar bearing upon the hub H is suspended from the top of the rim at all times so that during rotation of the rim the several springs S successively support this weight and thereby form a resilient support for the axle. From this operation, it will be seen that the vibrations to which the rim is subjected will not be transmitted to the hub H but are absorbed by the springs S. This prevents the transmission of the vibrations to the axle of the vehicle, and thereby forms a resilient support for the vehicle so that the employment of shock absorbers is rendered unnecessary.

In conjunction with the wheel just described I employ extensible spokes K which are associated with the rim and hub to prevent lateral movement of the latter, and to thereby stabilize the wheel in making sharp turns. In the present instance, I employ three spokes K regularly spaced about the hub H and each comprising a tubular section 16 and a sliding section 17. As illustrated to advantage in Fig. 2, the tubular section 16 is provided with a relatively broad head 16ª which is hingedly connected to the hub H by a pair of ears 18 formed on the periphery of the hub and a pivot pin 19 extending through the ears and through the inner end of the section. The solid section 17 is hingedly connected to the inner periphery of the rim R at a point between the springs S by a pair of ears 20 and a pivot pin 21, such section being slidably fitted within the section 16 to allow of a telescopic action between the two sections. Surrounding both of the sections and interposed between the rim R and the hub H is a coiled expansible spring 22, the function of which is to assist the springs S in biasing the sections to extended position and to return the sections to normal position after having been extended or shortened.

With this arrangement it will be seen that when the rim R is moved upwardly under the vibratory action of the wheel, the sections 17 of all of the spokes will be caused to slide inwardly or outwardly with respect to the section 16 according to the position of the spokes with relation to the vertical. Because of the fact that the spokes are hingedly connected to the rim and hub, it will be clear that free radial movement of the hub is permitted but any lateral movement thereof is prevented. Free radial movement of the hub H permits of the proper functioning of the springs S and 22 in absorbing the shocks transmitted to the hub, while locking of the hub against lateral movement prevents displacement of the same when subjected to any lateral stresses such as when the wheels turn a sharp corner.

It is to be particularly noted that the heads 16ª of the spokes K are of such a size as to sufficiently strengthen the spokes to resist any lateral motion thereof.

Although I have herein shown and described only one form of spring wheel embodying my invention, it is to be understood that various changes and modifications may be made herein without departing from the spirit of the invention and the spirit and scope of the appended claim.

What I claim is:

A wheel comprising, a rim, a hub, coiled springs connecting said rim and hub at regular spaced intervals throughout the circumference of the two, said springs being arranged in pairs and extending radially from the hub, extensible spokes pivotally connecting said rim and hub at intervals of 120° in a manner to prevent lateral movement of the hub with respect to the rim and to permit radial movement of said hub, and coiled springs surrounding said spokes and interposed between said rim and hub.

JAMES ARTHUR LIVINGS.